United States Patent [19]
Lung et al.

[11] Patent Number: 5,570,549
[45] Date of Patent: Nov. 5, 1996

[54] BUILDING ANCHORING SYSTEM

[76] Inventors: Jimmy R. Lung, 109 Calhoun Ave.; Wayne E. Lung, 124 Calhoun Ave., both of Destin, Fla. 32541

[21] Appl. No.: 275,974

[22] Filed: Jul. 15, 1994

[51] Int. Cl.$^6$ .................................................... E04C 3/10
[52] U.S. Cl. .......................... 52/295; 52/567; 52/293.3; 52/223.5; 52/92.1; 403/306; 411/342
[58] Field of Search ............................ 52/23, 295, 293.3, 52/223.5, 223.3, 566, 567, 223.13, 92.1, 730.7; 403/306, 307, 221, 222, 343; 411/340, 341, 342

[56] References Cited

U.S. PATENT DOCUMENTS

| | | | |
|---|---|---|---|
| 1,783,383 | 12/1930 | Montrief | 52/92.1 X |
| 2,011,018 | 8/1935 | Smith | 52/223.3 X |
| 3,233,376 | 2/1966 | Haillon et al. | 52/223.3 X |
| 3,890,758 | 6/1975 | Bouchard | 52/295 X |
| 3,965,542 | 6/1976 | Gregory | 52/223.13 X |
| 4,307,550 | 12/1981 | Behar | 52/223.13 |
| 4,321,776 | 3/1982 | Delight | 52/295 X |
| 4,718,209 | 1/1988 | Hansen et al. | 52/223.13 |
| 4,812,096 | 3/1989 | Peterson | 52/223.13 X |
| 4,953,332 | 9/1990 | Galloway | 52/223.5 |
| 5,050,355 | 9/1991 | Pildysh | 411/342 X |
| 5,051,047 | 9/1991 | Loncaric | 411/342 X |
| 5,168,681 | 1/1992 | Ayrapetyan | 52/227 X |
| 5,272,851 | 12/1993 | De La Fuente | 52/223.13 X |
| 5,379,562 | 1/1995 | Hohmann | 52/295 |
| 5,384,993 | 1/1995 | Phillips | 52/92.2 |

*Primary Examiner*—Wynn E. Wood
*Attorney, Agent, or Firm*—Arthur G. Yeager

[57] ABSTRACT

A house is anchored to the ground by extending a plurality of metal rods from anchors buried in a foundation to the upper framework of the house and clamping the house to each rod by a pair of spaced clamps, which includes a washer in each device around the rod jammed at an angle against the rod so as to be immovable in the tensile direction between the spaced clamps. The lower clamp is threaded onto the buried threaded anchor extending through the sole plate. A bolt extends through at least one top plate of an outer wall adjacent at least the outer corners of a building and threads into the upper clamp beneath the top plate.

20 Claims, 2 Drawing Sheets

BUILDING ANCHORING SYSTEM

BACKGROUND OF THE INVENTION

Residential buildings are normally placed on cement or cement block foundations, which are sunk below ground level with the upper surfaces above ground level. In most instances, there is no more than a minimal fastening between the buildings and the foundation, as by J-bolts having lower ends embedded in the cement and an upper threaded end passing through a sole plate with a washer and nut threaded thereon. This is usually sufficient, except for hurricanes and tornadoes. In view of the costly destruction of housing by high winds, it has become important to provide a construction of anchoring houses to their foundations. Various ways have been suggested but none has enjoyed widespread acceptance.

It is an object of this invention to provide a simple system for more adequately anchoring a building to its foundation including its top plate or plates of an outer wall. It is another object of this invention to provide a system whereby spaced metal rods under slight tension provide the principal resistance to high wind forces tending to move a house from its foundation. Still other objects will become apparent from the more detailed description.

BRIEF SUMMARY OF THE INVENTION

This invention relates to a building anchoring system comprising an elongated vertical unthreaded upright metal rod having adjacent each end thereof a pair of spaced clamps means automatically attachable at selected lengthwise end positions along the metal rod, each clamp means including a threaded bore for screw-thread attachment to a threaded member attachable to the building and another member to its foundation.

In preferred embodiments the metal rods are concrete reinforcing steel rods and the clamp means include a washer around the rod and spring biased at an angle thereto so as to be jammed between the rod and the clamp body and to prevent longitudinal tensile movement of the rod with respect to the body. The lower clamp means on the vertical rod is attached to an anchor embedded in the foundation. The upper clamp means is attached to the top plate or plates forming the upper framework of the house, preferably near the roof.

BRIEF DESCRIPTION OF THE DRAWINGS

The novel feature believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The invention is best understood by reference to the attached drawings.

Figure 1:
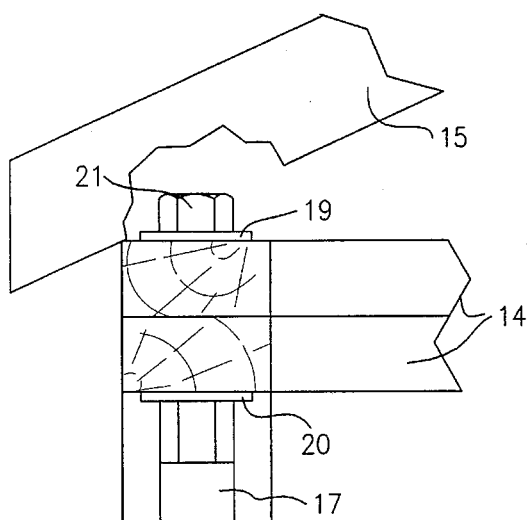
FIG. 1 is a schematic elevational view of a building employing the anchoring system of this invention.
Figure 3:
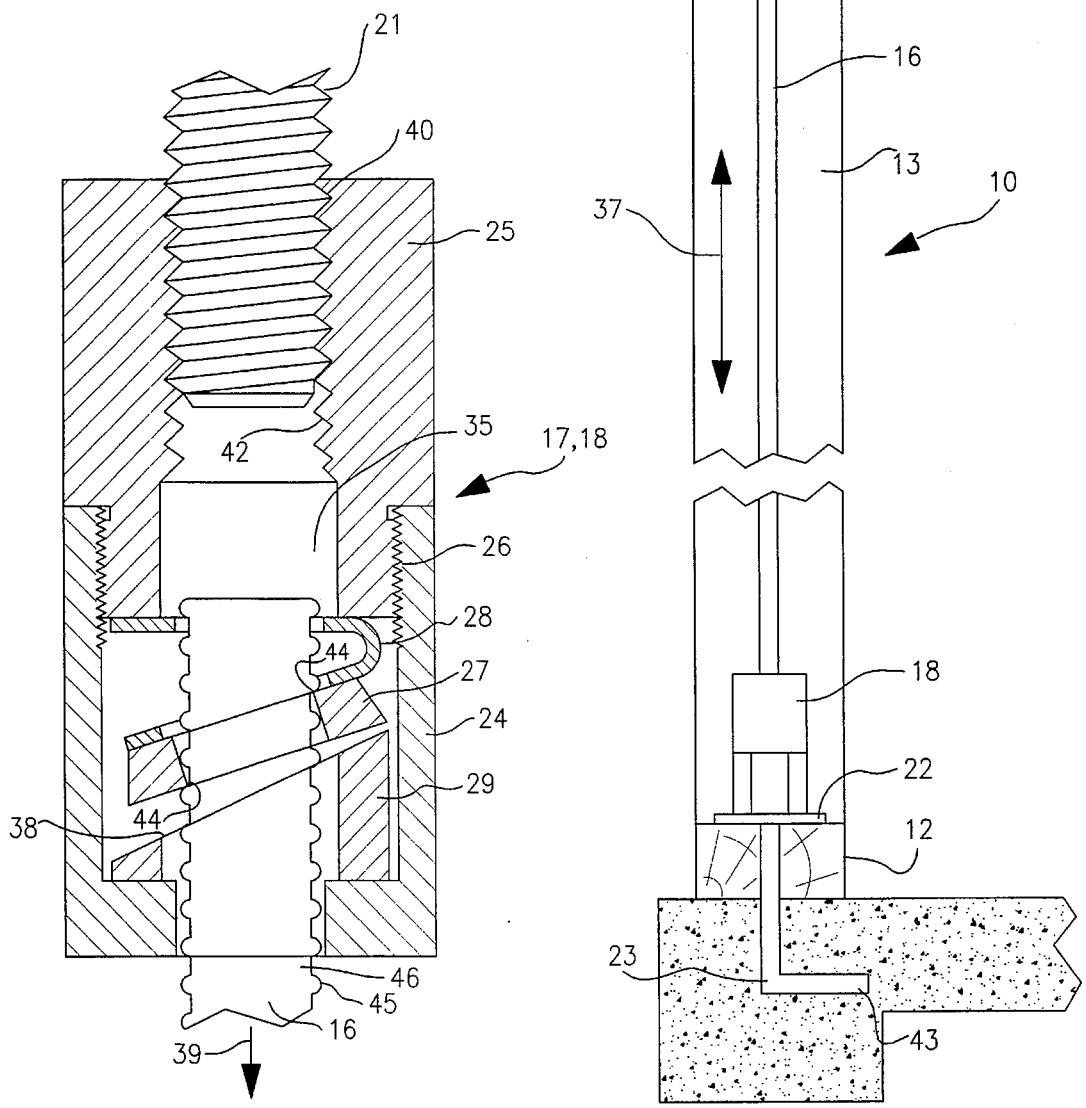
FIG. 3 is a cross-sectional view taken along line 3—3 of FIG. 2.

In FIG. 1 there is shown a schematic view of a corner of a building 10 made of wooden framework resting on a concrete foundation 11, and fitted with an anchoring system of this invention. A foundation system has been made of poured concrete placed into trenches dug into the ground,or a single slab may be poured. A house has been erected on the foundation 11 as shown by a sole plate or beam 12, a plurality of spaced vertical wall studs 13, and at least one top plate or horizontal beam 14, and the necessary roof rafters 15. It is to be understood that the precise numbers of and placements of beams in the housing structure are unimportant details with respect to the present invention. The anchoring system of this invention includes an elongated metal rod 16, e.g. a steel rod normally used in reinforcing concrete, extending from plate beam 12 to top ceiling beams 14 with a clamp devices 17, 18 connecting rod 16 respectively to the beams 14 and 12. Upper clamp 17 is attached to the upper beam 14 by a connector member in the form of a bolt 21 and washer 19, with the bolt being screwed into and mating with a threaded portion 42 of clamp 17. Lower clamp 18 is attached to foundation 11 by means of anchor rod 23, which has its lower angled end portion 43 embedded in concrete and its upper threaded end screwed into a threaded portion 42 of clamp 18, it being understood that FIG. 3 depiction of clamp 17 is flipped 180° when used as clamp 18. Washers 19, 20 and 21 are used to substantially prevent damage to wooden beams 12 and 14.

Clamp devices 17 and 18 are clamped onto rod 16 by means which will be described below such that there are slight tensile forces applied to rod 16 by clamps 17 and 18 in the direction of arrows 37.

Figure 2:
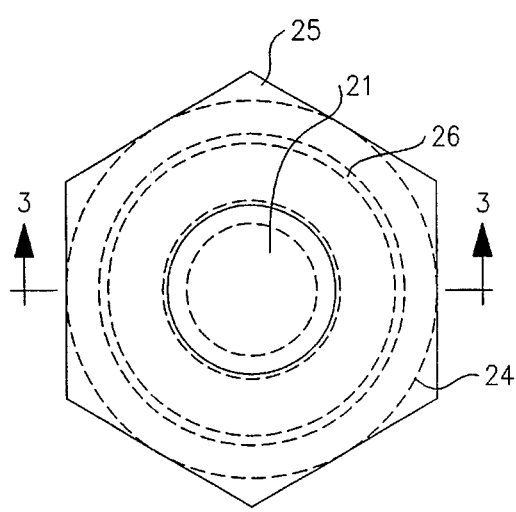
FIG. 2 is a top plan view of one embodiment of a clamp device according to this invention.

In FIGS. 2 and 3 there are shown the features of a first embodiment of the clamp device 17, 18 as a two-piece tubular structure having a lengthwise passageway 35. Primary portion 24 is joined to secondary portion 25 by a length of mating male/female screw threads 26. Primary portion 24 contains a washer 27 having sharp edges 44 encircling the end of elongated rod 16 along with follower 29. A spring 28 biases washer 27 against follower 29, which has an angular face 38. This places washer in a canted position that will jam an inside edge 44 of washer 27 against one or more of the ridges 45 on the outer surface 46 of elongated rod 16. Of course, if no ridges 45 are present, the edges 44 will bite into the outer surface 46 of the rod 16. This jamming functions as a wedge between rod 16 and washer 27 substantially prohibiting any lengthwise opposite movement between rod 16 and portions 24, 25 encircling rod 16. The specific movement prevented is that of rod 16 in the direction of arrow 39, which is the same direction as that which would provide the tensile forces applied to rod 16. The end of rod 16 is merely jammed into the clamp 18 after clamp 18 has been screwed onto anchor rod 23 above washer 22. Spring 28 keeps washer 27 in its jamming position, such that more tensile forces applied to rod 16 causes a greater jamming or biting force between washer 27 and rod 16. Rod 16, preferably, is a concrete reinforcing rod with transverse ridges 45 on its surface, or it may even be a smooth rod without transverse ridges and still be jammed by the canted washer 27. It is preferable, however, for the rod 16 to have some irregularities on its surface to make it easier to catch the sharp edges 44 of washer 27.

The other end of the clamp 17 or 18 includes a secondary portion 25 containing a threaded bore 40 to receive a threaded end of a rod 21 or 23 or some other type for attaching the rod 16 to the building or to its foundation. In FIG. 1 threaded bore 40 is mated with bolt 21 as shown or anchor rod 23 when flipped 180°. The outside surface of secondary portion 25 preferably is fashioned with flats, preferably hexagonal flats, so as to be turned by a suitable wrench. This permits loosening or tightening of the end clamps 17 and 18 in the clamping system of FIG. 1, and, in effect, provides a turnbuckle action with tensile forces 37 being applied to rod 16.

Figure 4:
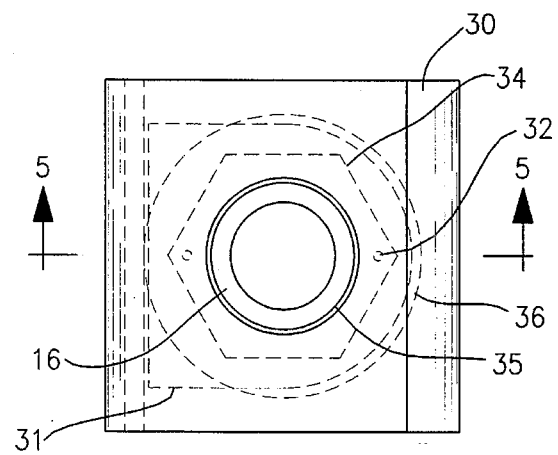
FIG. 4 is a top plan view of a second embodiment of a clamp device according to this invention.
Figure 5:
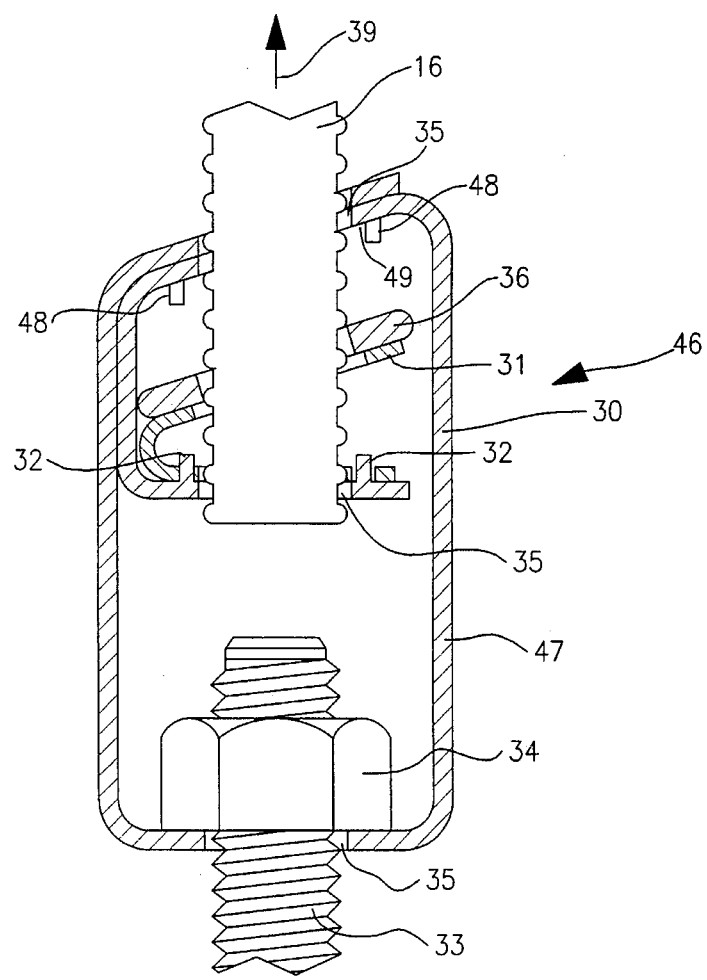
FIG. 5 is a cross-sectional view taken along line 5—5 of FIG. 4.

A second embodiment of the clamp device 46 of this invention is shown in FIGS. 4 and 5. The body 47 of the clamp 46 is made of a single long strap 30 of metal folded upon itself transversely to produce the structure, shown best in FIG. 5. The entire structure is pierced by a vertical passageway 35 through which rod 16 enters at the top of the view in FIG. 5, and threaded portion 33 of anchor rod 23 enters from the bottom. A loose washer 36 encircles rod 16 and is urged upwardly at an angle by leaf spring 31 held in place inside the clamp body by tabs 32, or other ways of preventing spring 31 from coming out under normal use. Likewise tabs 48 may be provided for washer 36 until the rod 16 is inserted therethrough. The spring action of leaf spring 31 caused washer 36 to catch the ridges in rod 16 and to be jammed against the upper wall 49 of the clamp, preventing relative movement between rod 16 and clamp body 30, particularly preventing any movement of rod 16 in the direction of arrow 39, which provides the tensile forces thereto as bolt 21 of FIG. 1 is tightened, for example.

Spring 28 or 31 is shown as a leaf spring, but it can be a coil spring or other type which will press washer 27 or 36 into a canted orientation that will cause the edges of the washer 27 or 36 to bite into the outer surface of rod 16.

Elongated metal rod 16 may be any sort of rod, although preferably it has a roughened surface, especially one with transverse irregularities such as the ridges on a normal concrete reinforcing rod. The jamming of an edge of a washer will occur against a smooth surface, but obviously a roughened surface will provide a better surface to be caught by the edges of a washer. Similarly a washer with a pair of sharp inside edges are preferred over a washer with a smoothly rounded edge.

The building anchoring system affixes outer walls of a building having a sole plate 12 and at least one top plate with spaced studs 13 therebetween and having spaced flooring bolts 23 extending from the flooring through the sole plate 12 with exposed threads thereabove. The system includes a plurality of s spaced elongated metal rods 16 having opposite end portions and being located adjacent outside corners of a building 10. The rods 16 extend approximately between at least one top plate 14 and a sole plate 12, and a pair of clamping means 17, 18 are attached to respective opposite end portions of each rod 13. The clamping means 17, 18 include a threaded connection 42 facing away from respective opposite end portions of rod 16. The threaded connection 42 adjacent a sole plate 12 being threaded onto exposed threads 33 (seen in FIG. 5) of a flooring bolt 23. The threaded bolt 21 extends through and is substantially vertically aligned with respective metal rod 16 and is threaded onto the threaded connection 42 adjacent at least one top plate 14. The bolt 21 is tightenable to remove any slack between the pair of clamping means 17, 18 and the rod and to maintain the rod taut and, if desired under slight tensile forces.

As mentioned, a grounding wire, if found desirable or necessary, may be provided to all such elongated rods 16 or the anchoring members 23 to provide electrical protection due to lightening or the like.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An anchoring system for a building having a wall with a sole plate and a top plate, said system comprising an elongated metal rod having opposite end portions with roughened surfaces, a pair of clamping means respectively attachable to said rod end portions by vertical sliding jamming relative movement therebetween without rotation and positionable vertically between a sole plate and a top plate, each said clamping means having a thread means for threadedly attaching each of said clamping means to a threaded member extendable through a sole plate and top plate of a building wall.

2. The system of claim 1 wherein said clamping means includes a wedging member and a spring biasing said wedging member toward said rod.

3. The system of claim 1 wherein a plurality of said enlogated metal rods and pairs of said clamping means are spaced around an outer wall of a building in vertical positions, each said thread means of said clamping means adjacent a sole plate being theadedly connected to a buried ground anchor having an upwardly extending threaded end portion.

4. The system of claim 1 wherein an outer wall of a building is a wooden structure supporting a roof with an outer wall resting on a cementitious foundation, and wherein a threaded member adjacent a sole plate includes an anchor embedded in a cementitious foundation.

5. The system of claim 4 wherein said threaded member adjacent a top plate extends therethrough, and is connected to said thread means of said clamping means adjacently below a top plate.

6. The system of claim 1 wherein said clamping means includes a hollow cylindrical body adapted to fit loosely and concentrically around said elongated metal rod, a lock washer within said body and surrounding said rod, and a spring fitting around said rod and bearing against said washer so as to cant said washer at an angle to said rod and to forcibly jam said washer around said rod so as to substantially prohibit lengthwise separating movement of said rod with respect to said body.

7. The system of claim 6 wherein said rod is clamped by said clamping means adjacent a sole plate after connection of said thread means of said clamping means adjacent a sole plate, and then said rod is clamped by said clamping means adjacent a top plate prior to connection of a threaded member adjacent a top plate to said thread means of said clamping means adjacent a top plate.

8. A clamp device comprising a tubular body with a central lengthwise bore adapted to permit an elongated rod to be passed concentrically therethrough and clamped thereto said tubular body having a primary portion and a secondary portion joined together, said primary portion containing a spring-biased washer around said bore and canted at an angle to permit wedging against an elongated rod when pushed thereinto, and to substantially prohibit lengthwise separating movement of said washer and said tubular body with respect to a wedged elongated rod in a direction which induces further wedging of said washer thereonto.

9. The clamp device of claim 8 wherein said secondary portion includes thread means for threadedly connecting to a threaded end member to secure said clamp device in position.

10. A clamp device comprising an elongated strip of metal folded transversely upon itself to produce a vertical column of generally square transverse cross-section with a vertical central axis and a cylindrical vertical passageway centered about said axis having an upper exit and a lower exit, the lower exit of said passageway adapted to receive a threaded end portion of a rod therethrough, said device having a nut with internal threads threaded onto a threaded end portion of a rod, the upper exit of said passageway being positioned at an acute angle to said axis and containing a washer around said passageway at said angle, a spring means biasing said washer outwardly generally along said passageway for maintaining said washer at said angle, said passageway being adapted to receive therein a generally smooth metal rod or a metal rod with transverse surface ridges, or other concrete reinforcement rod.

11. The clamp device of claim 10 wherein said washer includes sharp internal edges for biting into a metal rod as opposite forces are being applied to a rod and said device.

12. A building anchoring system adapted to affix outer walls of a building having a sole plate and at least one top plate with spaced studs therebetween and having spaced flooring bolts extending from the flooring through the sole plate with exposed threads thereabove, said system comprising a plurality of spaced elongated metal rods having opposite end portions and being located adjacent outside corners of a building, said rods extending approximately between at least one top plate and a sole plate, a pair of clamping means vertically slidably jammed onto respective said opposite end portions of each said rod without relative rotation therebetween, said clamping means being located between at least one top plate and a sole plate and having a threaded connection facing away from respective said opposite end portions of said rod, said threaded connection adjacent a sole plate being threaded onto exposed threads of a flooring bolt and a threaded bolt extending through and substantially vertically aligned with said metal rods respectively and being threaded onto said threaded connection adjacent said at least one top plate, said bolt being tightenable to remove any slack between said pair of clamping means and said rod and to maintain said rod taut.

13. The system of claim 12 wherein each of said clamping means includes a wedge.

14. The system of claim 13 wherein each of said clamping means includes a spring biasing said wedge into engagement with said rod.

15. The system of claim 13 wherein said wedge is formed by a slanted washer.

16. The system of claim 15 wherein said washer includes at least one internal edge for biting into an outer surface of said rod.

17. The system of claim 15 wherein said washer includes a pair of spaced internal edges for biting into an outer surface of said rod.

18. The system of claim 12 wherein each of said clamping means includes a hollow cylindrical body adapted to fit loosely and concentrically around said rod, a lock washer within said body and surrounding said rod, and a spring fitting around said rod and bearing against said washer so as to cant said washer at an angle to said rod and to forcibly jam said washer around said rod so as to substantially prohibit lengthwise separating movement of said rod with respect to said body.

19. The system of claim 12 wherein each said clamping means includes a central lengthwise bore adapted to permit said rod to be passed concentrically therethrough and clamped thereto, said tubular body having a primary portion and a secondary portion joined together, said primary portion containing a spring-biased washer around said bore and canted at an angle to permit wedging against said rod when pushed thereinto and to substantially prohibit lengthwise separating movement of said washer and said tubular body with respect to said rod in a direction which induces further wedging of said washer.

20. The system of claim 12 wherein each said clamping means includes an elongated strip of metal folded transversely upon itself to form a vertical column of generally square transverse cross-section with a vertical central axis and a cylindrical vertical passageway centered about said axis, the lower exit of said passageway adapted to receive a threaded end portion of a member therethrough a nut with internal threads threaded onto a threaded end portion of a rod, the upper exit of said passageway being positioned at an acute angle to said axis and containing a washer having at least one sharp internal edge around the passageway at said angle, spring means biasing said washer at said angle, said passageway being adapted to receive therein said elongated rod.

\* \* \* \* \*